United States Patent
Mi et al.

(10) Patent No.: US 7,522,141 B2
(45) Date of Patent: Apr. 21, 2009

(54) CHOLESTERIC LIQUID CRYSTAL DISPLAY SYSTEM

(75) Inventors: Xiang-Dong Mi, Rochester, NY (US); Joshua M. Silbermann, Rochester, NY (US); Jorge I. Rangel, Rochester, NY (US); Stanley W. Stephenson, Spencerport, NY (US)

(73) Assignee: Industrial Technology Research Institute, Hsinchu (TW)

( * ) Notice: Subject to any disclaimer, the term of this patent is extended or adjusted under 35 U.S.C. 154(b) by 655 days.

(21) Appl. No.: 10/725,241

(22) Filed: Dec. 1, 2003

(65) Prior Publication Data

US 2005/0116908 A1 Jun. 2, 2005

(51) Int. Cl.
*G09G 3/36* (2006.01)
*G02F 1/133* (2006.01)

(52) U.S. Cl. .......................... 345/95; 349/20
(58) Field of Classification Search ............. 349/20–22, 349/24; 345/87, 94–95, 97, 98, 106
See application file for complete search history.

(56) References Cited

U.S. PATENT DOCUMENTS

| | | | |
|---|---|---|---|
| 3,401,262 A | 9/1968 | Fergason et al. | |
| 3,578,844 A | 5/1971 | Kettering et al. | |
| 3,789,225 A | 1/1974 | Leder | |
| 3,972,588 A | 8/1976 | Adams et al. | |
| 4,965,591 A * | 10/1990 | Kurabayashi et al. | 347/221 |
| 5,066,107 A * | 11/1991 | Yoshinaga et al. | 349/183 |
| 5,080,467 A * | 1/1992 | Kahn et al. | 349/161 |
| 5,357,356 A * | 10/1994 | Konuma et al. | 349/93 |
| 5,437,811 A | 8/1995 | Doane et al. | |
| 5,695,682 A | 12/1997 | Doane et al. | |
| 6,154,190 A | 11/2000 | Yang et al. | |
| 6,268,840 B1 | 7/2001 | Huang | |
| 6,423,368 B1 | 7/2002 | Stephenson et al. | |
| 6,639,637 B2 | 10/2003 | Stephenson | |
| 7,138,973 B2 * | 11/2006 | Okafuji et al. | 345/94 |
| 2002/0005827 A1 | 1/2002 | Kobayashi | |
| 2003/0206147 A1 * | 11/2003 | Mi et al. | 345/87 |

OTHER PUBLICATIONS

Stanley W. Stephenson et al., "A dielectric Layer for Dispersed Liquid Crystal Coatings", Jul. 26, 2001, U.S. Appl. No. 09/915,441.
S. Yamamoto et al., "A Novel Photoaddressable Electronic Paper Utilizing Cholesteric LC Microcapsules and Organic Photoconductor", pp. 362-365, 2001.

* cited by examiner

*Primary Examiner*—Sumati Lefkowitz
*Assistant Examiner*—William L Boddie
(74) *Attorney, Agent, or Firm*—Alston & Bird LLP

(57) ABSTRACT

A method of writing an image on a liquid crystal display of the type having a layer of cholesteric liquid crystal material disposed between a pair of unpatterned conductors and a light absorbing layer for forming an image wise thermal pattern in response to an image wise pattern of light, including applying a first voltage to the conductors; applying a second voltage different from the first voltage to the conductors after applying the first voltage, wherein the first and second voltages are non-zero; and exposing the liquid crystal display to the image wise pattern of light.

33 Claims, 12 Drawing Sheets

CHOLESTERIC LIQUID CRYSTAL DISPLAY SYSTEM

FIELD OF THE INVENTION

The present invention relates to a display system having a cholesteric liquid crystal that changes optical states in response to heat, light and electrical field.

BACKGROUND OF THE INVENTION

Cholesteric liquid crystals have the property of maintaining several different optical states in the absence of electrical field. Additionally, cholesteric liquid crystals can change optical states in response to applied electrical and/or thermal fields. Those properties make them useful in the development of field stable, re-writable displays.

U.S. Pat. No. 3,401,262 issued Sep. 10, 1968 to Fergason et al. discloses a cathode ray tube to apply light to a screen. The screen has a photoconductive layer that is excited by an electrical field applied by fine leads across the photoconductive layer. The screen has a layer of a temperature sensitive cholesteric material that changes reflective wavelength with slight changes in temperature, and changes hue in heated areas. Light from the cathode ray tube strikes the photoconductor layer, creating heat that can be used to selectively change the color of the sheet of cholesteric material. The system uses a complex cathode ray tube and a photoconductor layer and ceases to present an image in the absence of an electrical field.

U.S. Pat. No. 3,578,844 issued May 18, 1971 to Churchill discloses a sheet of gelatin encapsulated cholesteric material without a photosensitive layer. The sheet is put into a first reflective state by heating. Portions of the sheet are written into a black (clear) state by the application of DC fields. The sheet is heated to reset the display. The encapsulated material in the sheet retained written information without fade at ambient conditions for eight weeks.

U.S. Pat. No. 3,789,225 issued Jan. 29, 1974 to Leder discloses a glassy cholesteric liquid crystal between glass plates. Glassy liquid crystal materials are solidified liquid crystals in an orderly state at ambient temperatures. They are not responsive to electrical fields in the glassy state. The apparatus writes the sheet to an initial state by heating the material above the isotropic (liquid) transition point. As the material is cooled, a high intensity xenon flash lamp is used to disturb the material so that flash disturbed areas solidify into a state different than areas not receiving flash energy. The imaging system requires that the materials be raised to a high temperature, and cooled at a fast rate in the presence of selective high intensity flash light. No electrical fields are applied to the media.

Conventional, non glassy liquid crystals have the property of being electrically driven between a planar state reflecting a specific visible wavelength of light and a light scattering focal conic state at ambient temperatures. Chiral nematic liquid crystals, also known as cholesteric liquid crystals have the capacity of maintaining one of multiple given states in the absence of an electric field. U.S. Pat. No. 5,437,811 issued Aug. 1, 1995 to Doane et al. discloses a light modulating cell having a polymer dispersed chiral nematic liquid crystal. The chiral nematic liquid crystal has the property of being driven between a planar state reflecting a specific visible wavelength of light and a weakly light scattering focal conic state. Chiral nematic liquid crystals, also known as cholesteric liquid crystals, have the capacity of maintaining one of multiple given states in the absence of an electric field. The Doane et al. patent discloses the use of only electrical fields to change the optical state of cholesteric liquid crystals. The technology writes image data line sequentially. Sequentially writing data lines is slow compared to writing all pixels at once and requires electrical drivers on each column and row line.

U.S. Pat. No. 6,268,840 issued Aug. 1, 1995 to Huang discloses phased drive signals applied to a cholesteric display incorporating multiple voltage levels applied to the material in a sequence. A first preparation phase forces cholesteric liquid crystal into the homeotropic state. In the selection phase, sequential lines of data have the one of two voltages applied to each pixel. A lower voltage applies a moderate voltage level to the liquid crystal to unwritten lines and for a period after all lines are written. The process is applicable to sequentially writing lines of cholesteric material using electrical fields, however the lines must be electrically written sequentially.

Yamamoto et al. in A Novel Photoaddressable Electronic Paper Utilizing Cholesteric LC Microcapsules and Organic Photoconductor, SID 2001 DIGEST, pp. 362-365, create an electronic paper having a photoconductive layer and a polymer encapsulated cholesteric liquid crystal that is field responsive at ambient temperatures. A high electrical field is applied across both layers, and the photoconductive layer provides a bias voltage in the presence of light. The high and low field states across the material write cholesteric material into different optical states.

Prior art light sensitive sheets have required expensive and complex photosensitive layers for operation. Electrical drive systems must write data sequentially, requiring complex electronic drives. Glassy liquid crystals change state with the application of large amounts of heat and no electrical field. There is a need therefore for a light written sheet that could have image data written simultaneously without a photosensitive layer at low temperatures.

SUMMARY OF THE INVENTION

The need is met according to the present invention by providing a method of writing an image on a liquid crystal display of the type having a layer of cholesteric liquid crystal material disposed between a pair of unpatterned conductors and a light absorbing layer for forming an image wise thermal pattern in response to an image wise pattern of light that includes applying a first voltage to the conductors; applying a second voltage different from the first voltage to the conductors after applying the first voltage, wherein the first and second voltages are non-zero; and exposing the liquid crystal display to the image wise pattern of light.

ADVANTAGES

The present invention has the advantage that it provides a method for writing high quality images using conventional liquid crystal display having poor modulation properties in the combined visible and infrared spectrum. The writing process is fast, and improves image quality over displays written only electrically.

DETAILED DESCRIPTION OF THE PREFERRED EMBODIMENT

Figure 1:
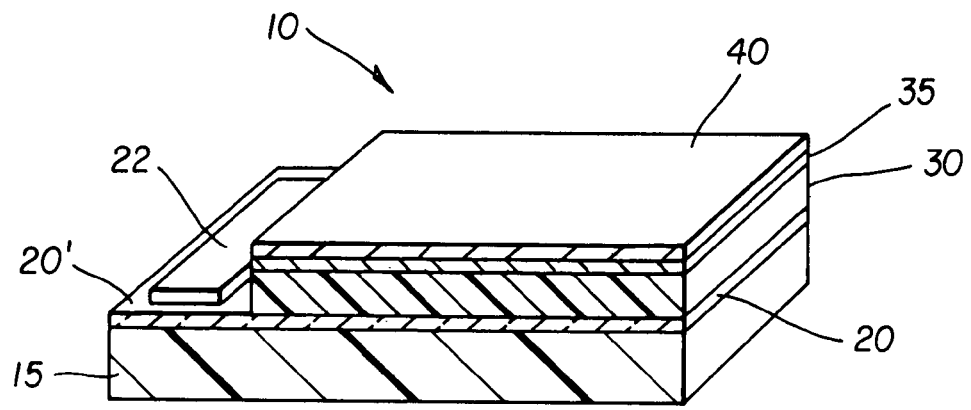
FIG. 1 is a partial cross sectional view of a prior art display that can be written in accordance with the present invention.

FIG. 1 is a partial cross sectional view of a display which can be written in accordance with the present invention. The display 10 includes a display substrate 15, such as a thin transparent polymeric material, for example, Kodak Estar film base formed of polyester plastic that has a thickness of between 20 and 200 (preferably 125 microns). Other polymers, such as transparent polycarbonate, can also be used.

A first transparent conductor 20 is formed on display substrate 15. First transparent conductor 20 can be tin oxide, indium tin oxide (ITO), or polythiophene, with ITO being the preferred material. Typically the material of first transparent conductor 20 is sputtered or coated as a layer over display substrate 15 having a resistance of less than 1000 ohms per square.

Cholesteric layer 30 overlays a first portion of first transparent conductor 20. A portion of cholesteric layer 30 is removed or is uncoated to create exposed first conductor 20' to permit electrical contact. Cholesteric layer 30 contains cholesteric liquid crystal material, such as those disclosed in U.S. Pat. No. 5,695,682 issued Dec. 9, 1997 to Doane et al. Application of electrical fields of various intensity and duration can be employed to drive a chiral nematic material (cholesteric) into a reflective state, to a substantially transparent state, or an intermediate state. These materials have the advantage of having first and second optical states that are both stable in the absence of an electrical field. The materials can maintain a given optical state indefinitely after the field is removed. Cholesteric liquid crystal materials can be Merck BL112, BL118 or BL126, available from E.M. Industries of Hawthorne, N.Y.

Cholesteric layer 30 is E.M. Industries' cholesteric material BL-118 dispersed in deionized photographic gelatin. The liquid crystal material is mixed at 8% concentration in a 5% gelatin aqueous solution. The liquid crystal material is dispersed to create an emulsion having 8-10 micron diameter domains of the liquid crystal in aqueous suspension. The domains can be formed using the limited coalescence technique described in U.S. Pat. No. 6,423,368 issued Jul. 23, 2002 to Stephenson et al. The emulsion is coated on a polyester display substrate over the first transparent conductor(s) and dried to provide an approximately 9-micron thick polymer dispersed cholesteric coating. Other organic binders such as polyvinyl alcohol (PVA) or polyethylene oxide (PEO) can be used in place of the gelatin. Such emulsions are machine coatable using coating equipment of the type employed in the manufacture of photographic films. A thin layer of gelatin can be applied over the first transparent conductor 20 to provide an insulator prior to applying cholesteric layer 30 as disclosed copending U.S. Ser. No. 09/915,441 filed Jul. 26, 2001 by Stephenson et al.

Figure 2:
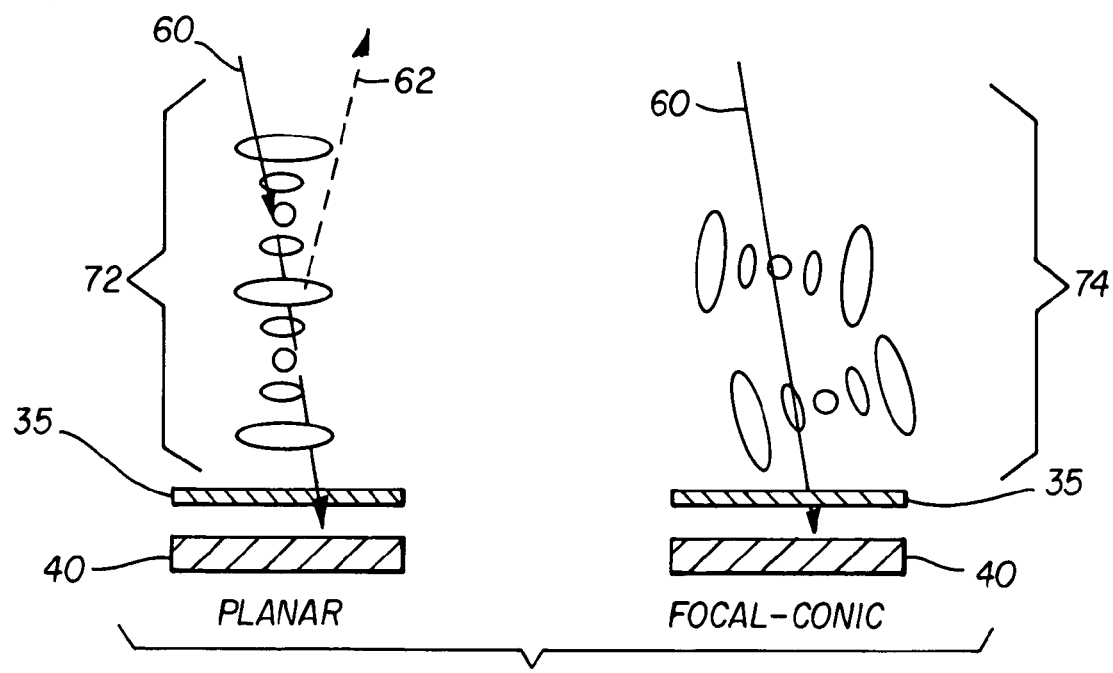
FIG. 2 is a schematic side view of chiral nematic material in a planar and focal-conic state responding to incident light useful in describing the operation of the display of FIG. 1.

FIG. 2 is a schematic side sectional view of a chiral nematic material in a planar and focal conic state responding to incident light. In the figure on the left, after a high voltage field has been applied and quickly switched to zero potential, the liquid crystal molecules become planar liquid crystal 72, which reflect portions of incident light 60 as reflected light 62. In the figure on the right side of FIG. 2, upon application of a lower voltage field, the molecules of the chiral nematic material break into weakly forward scattering cells known as focal conic liquid crystal 74. Increasing the time duration of a low voltage pulse progressively drives the molecules that were originally reflective planar liquid crystal 72 towards a fully evolved and weakly light scattering focal conic liquid crystal 74.

A light absorbing dark layer 35 (herein called a dark layer because it absorbs visible and IR light, but it can absorb only a portion of the visible spectrum and have a colored appearance) is positioned on the side opposing the incident light 60. Dark layer 35 can be a thin layer of light absorbing, submicron carbon in a gel binder as disclosed in U.S. Pat. No. 6,639,637 issued Jun. 26, 2003 to Stephenson. As fully evolved focal conic liquid crystal 74, the cholesteric liquid crystal is forward light scattering and incident light 60 passing through dark layer 35 and is absorbed to create a black image. Progressive evolution towards the focal conic state causes a viewer to perceive reflected light 62 that is reduced to black as the cholesteric material changes from reflective planar liquid crystal 72 to a fully evolved light scattering focal conic liquid crystal 74. When the field is removed, cholesteric layer 30 maintains a given optical state indefinitely. The states are more fully discussed in U.S. Pat. No. 5,437,811, referenced above.

Returning to FIG. 1, dark layer 35 is disposed between second conductor 40 and cholesteric layer 30 to improve contrast. A second conductor 40 overlays cholesteric layer 30.

Second conductor 40 has sufficient conductivity to provide an electric field between the first transparent conductor 20 and second conductor 40 strong enough to change the optical state of the cholesteric material in cholesteric layer 30. Second conductor 40 can be formed, for example, by the well known technique of vacuum deposition for forming a layer of conductive material such as aluminum, tin, silver, platinum, carbon, tungsten, molybdenum, tin or indium or combinations thereof. Second conductor 40 can also be formed by screen printing a conductive ink such as Electrodag 423SS screen printable electrical conductive material from Acheson Corporation. Such screen printable conductive materials comprise finely divided graphite particles in a thermoplastic resin. Screen printing is preferred to minimize the cost of manufacturing the display. A first conductor cover 22 can be similarly printed over first transparent conductor 20. First conductor cover 22 protects first transparent conductor 20 from abrasion.

The use of a flexible support for display substrate 15, first transparent conductor 20, machine coated dark layer 35, and cholesteric layer 30; and printed second conductor 40, and first conductor cover 22 permits the fabrication of a low cost flexible display. Small flexible displays can be used as rewritable tags for inexpensive, limited rewrite applications.

Figure 3:
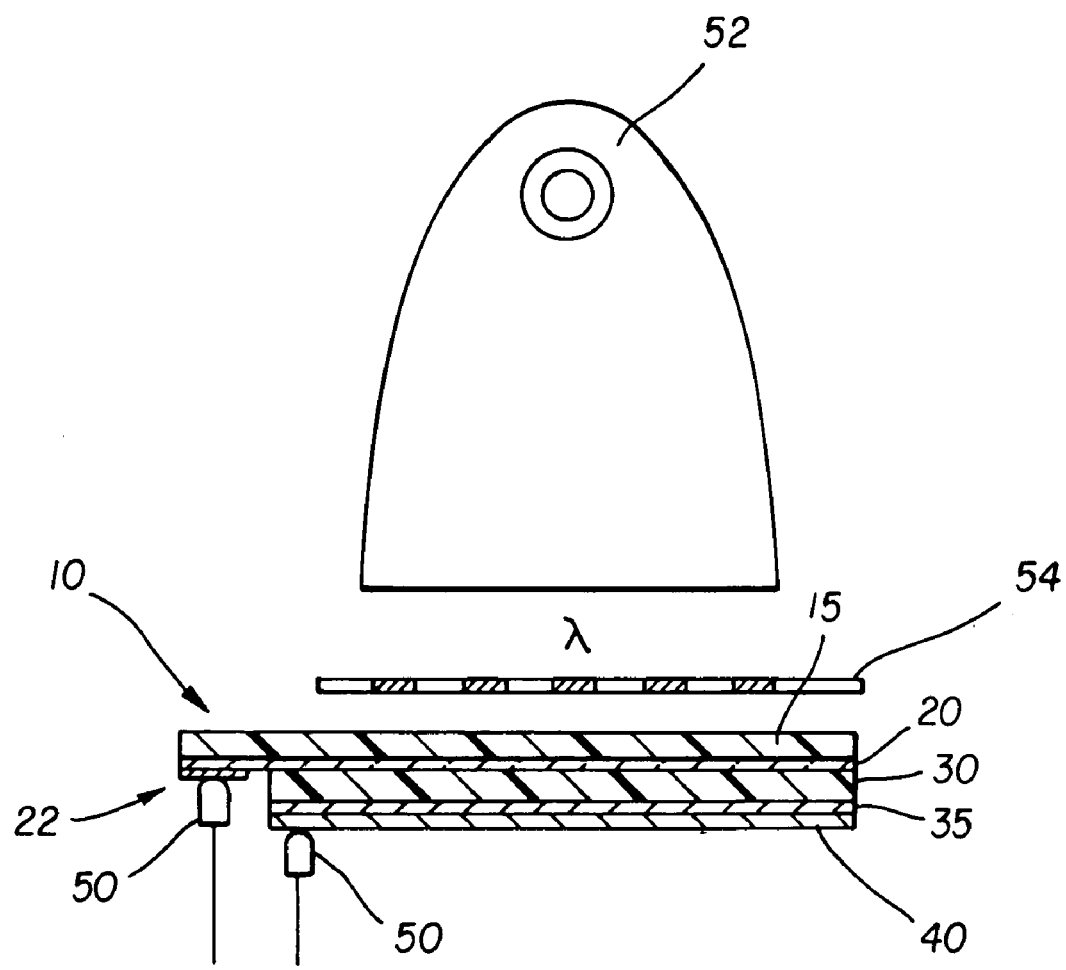
FIG. 3 is schematic side view of apparatus used to write an image on a display in accordance with the present invention.

FIG. 3 is schematic side view of an experimental setup used to write a display in accordance with the present invention. In FIG. 3, a display 10 was positioned so that a conventional xenon flash 52 exposed portions of display 10 through mask 54. In the experiment, flash 52 was a Vivitar model 285HV professional flash lamp and mask 54 was a sheet of Dupont Mylar transparency with an electrophotographic printed image. The output of flash 52 was adjusted to imprint an image on display 10 if the cholesteric material was initially either planar liquid crystal 72 or focal-conic liquid crystal 74.

Electrodes 50 were applied to first conductor cover 22 and second conductor 40. A constant electrical field was applied across electrodes 50, and flash imprinted images on display 10 were erased. Display 10 could be imprinted and erased multiple times without damage to display 10. Display 10 was positioned so that the black second conductor 40 faced flash 52 and mask 54. Flash 52 could be adjusted so that images were imprinted through opaque second conductor 40. The images can be electrically erased using a field across electrodes 50. From these experiments, it was concluded that the printing process occurs due to the electric field applied across first and second conductors and thermal energy being applied to second conductor 40 through either side of display 10. A heat pulse of correct power and duration provides a thermal flux effect that can write cholesteric material into either the planar or focal conic state or combination of the two states. These experiments demonstrated the utility of masked high intensity light to thermally print and reprint images on polymer dispersed cholesteric liquid crystals. The method and materials permit multiple erasure and writing cycles. Furthermore, the structure of display 10 is flexible and low cost.

Experiments were performed to determine the response of display 10 to the application of constant electrical fields during the thermal heat pulses from flash 52. In a first experiment, display 10 was electrically written into the planar state using a high voltage pulse. The output of flash 52 was set so initially planar liquid crystal was selectively written into the focal conic state in unmasked areas. The display was repeatedly reset to the planar state, and written using a series of voltages.

To increase the lifetime of liquid crystal displays, it is known to apply bipolar drive voltages to the electrodes of the display to reduce charge build up at the surfaces of the electrodes. It is to be understood that the term voltage as used herein may refer to a root mean square (RMS) voltage that is generated by a bipolar waveform. The value of the RMS voltage is determined by the amplitude and duty cycle of the bipolar voltage waveform applied to the electrodes of the display. Different combinations of amplitude and duty cycle may be used to generate any given RMS voltage. As used herein, the term voltage may refer to a zero or non-zero RMS voltage.

Figure 4:
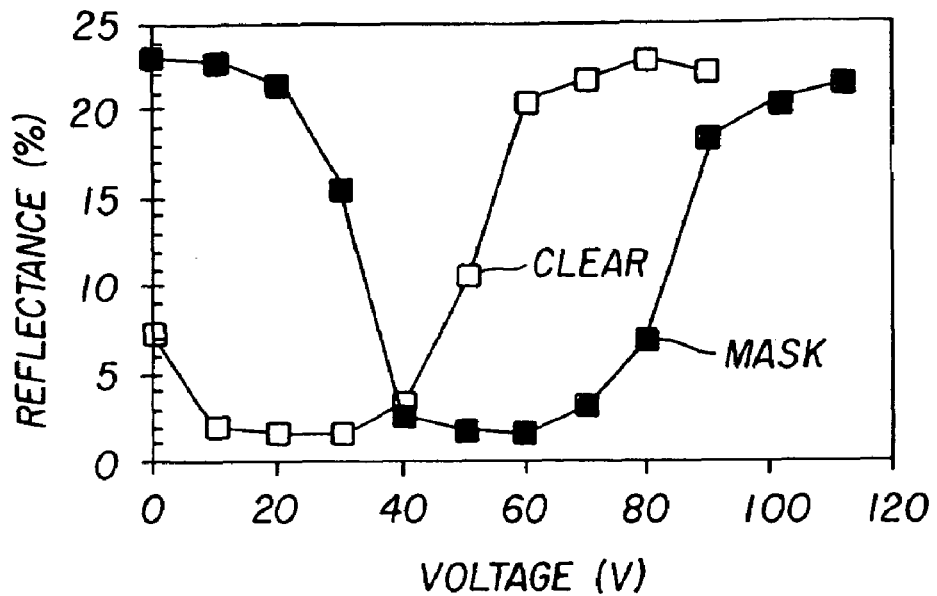
FIG. 4 is a plot of the response of the display of FIG. 1, originally in the planar state, to constant flash lamp energy and various voltages.

FIG. 4 is a plot of the response of the display of FIG. 1, originally in the planar state, at constant flash lamp energy and various voltages. For each test, the material was initialized into the planar state using a high voltage pulse. A constant test voltage was applied during a flash event. The resulting curve is equivalent to the response curve found in the Doane et al. patent for electrically written cholesteric liquid crystal. The curve for the masked portion of the display (filled boxes) is the same as the response of a display in the absence of the thermal pulse provided by flash 52. The curve for the unmasked (clear) portion of the display shows the response of the display in the presence of the heat pulse from the flash combined with a constant electrical field. At zero applied voltage and without a mask, planar material is written into the focal conic state and has a reflectance of about 7 percent. Applying a low voltage, such as 10 volts, improves the clarity of focal conic state from 7 percent to about 2 percent reflectance. It can be seen from FIG. 4 that applying a high voltage, such as 60 volts, can result in another pair of bistable states.

Figure 5:
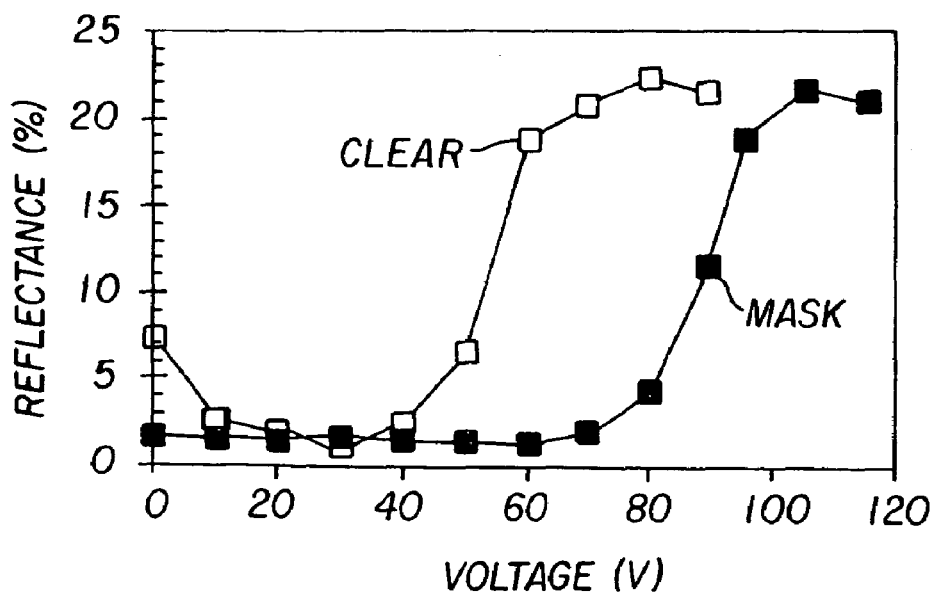
FIG. 5 is a plot of the response of the display of FIG. 1, originally in the focal-conic state, to constant flash lamp energy and various voltages.

FIG. 5 is a plot of the response of the display of FIG. 1, originally in the focal conic state, at constant flash lamp energy and various voltages. Application of a low field again reduces the reflection of focal conic material from 7 percent to 2 percent. Only one pair of bistable states is possible in this system, again at 60 volts, which has a contrast ratio of about 13. Material initially in the focal conic state remains in the focal conic state at a medium level voltage. Energy from flash 52 causes initially focal-conic material to be driven into the planar state. Apparently, heat from flash 52 reduces the voltage required to drive cholesteric material into the planar state.

It was observed that at 60 volts of applied field, the final state of the material was defined by mask 54 if the material was initially in either the planar or focal conic state. The phenomenon eliminates the need to initially write the material into an initial state before flash writing an image. The single writing process, without an initialization step, provides a fast, parallel method of writing display 10.

Figure 6:
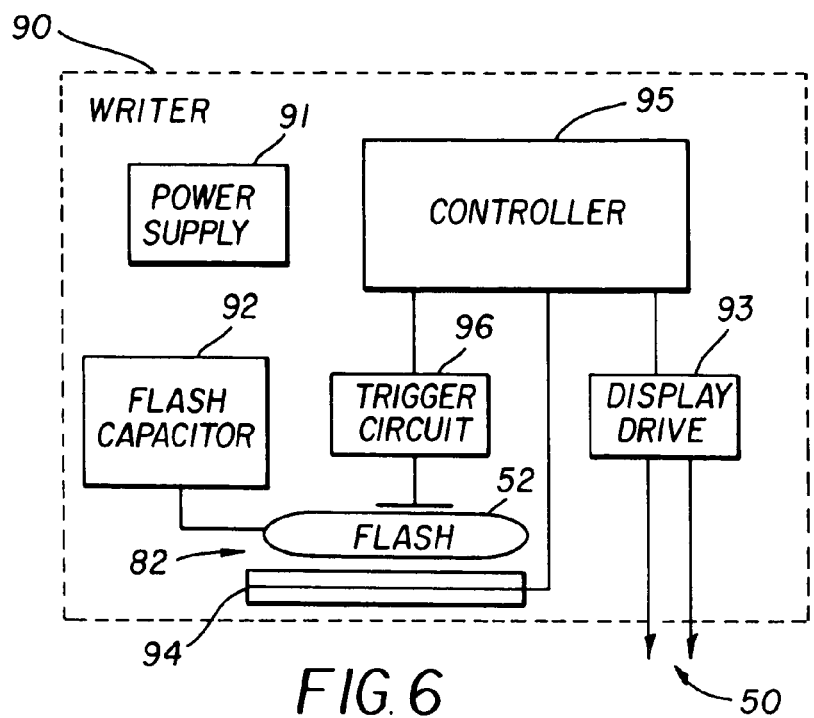
FIG. 6 is an electrical schematic diagram for a display writer useful in practicing the method of the present invention.

FIG. 6 is an electrical schematic for a display writer 90 useful in practicing the present invention. A power supply 91 provides power to a flash capacitor 92 and to the display drive 93. A masking display 94 is disposed to selectively mask the output of flash 52. Masking display 94 can be a simple twisted nematic (TN) or super twisted nematic (STN) display of conventional design. Controller 95 supplies information to masking display 94. Controller 95 applies writing voltage to electrodes 50 through display drive 93, connected to display 10. A trigger circuit 96 triggers flash 52 in conjunction with the application of a bipolar electrical field from display drive 93. The flash energy is masked by masking display 94 to apply an image wise light pattern from flash 52 in conjunction with an applied field to write an image on display 10.

Figure 7:
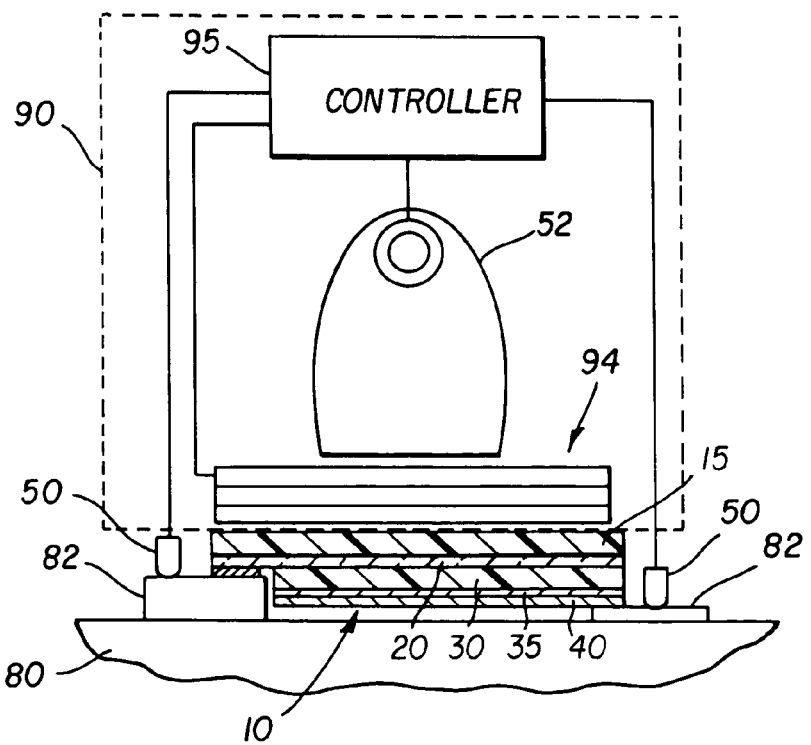
FIG. 7 is a side section view of the writer connected to a display used in practicing the method of the present invention.

FIG. 7 is a side section view of the writer 90 connected to the display 10. Display 10 is attached to an object 80, which has conductive adhesive contacts 82 attaching display 10 to object 80. Writer 90 is connected to display 10 when electrodes 50 are pressed against contacts 82. Sensors (not shown) of conventional design can be connected to controller 95 to signal that writer 90 is connected to display 10. Switching means can activate controller 95 to write an image to display 10. Writer 90 can be detached from display 10, and used to write other displays 10. Object 80 has attached information on display 10 that has been updated.

In an experiment, a dot matrix super twisted-nematic (STN) display, part number TM 13164 BCHG-1 from Tianma Microelectronics Corporation in China was placed over a display 10 which was built in accordance to the preferred embodiment. A Vivitar flash, already described, was adjusted so that light absorbing portions of the STN display masked the flash and transparent portions of the STN display passed flash light. The masking effect was sufficient to write areas of display 10 into the focal conic or planar states depending on the optical state of the masking display 94. The flash unit was discharged through the STN display repeatedly with no observable harm to the structure of the STN display or display 10. The experiment shows that it is possible to use simple, low-cost STN displays as masking display 94.

Figure 8:
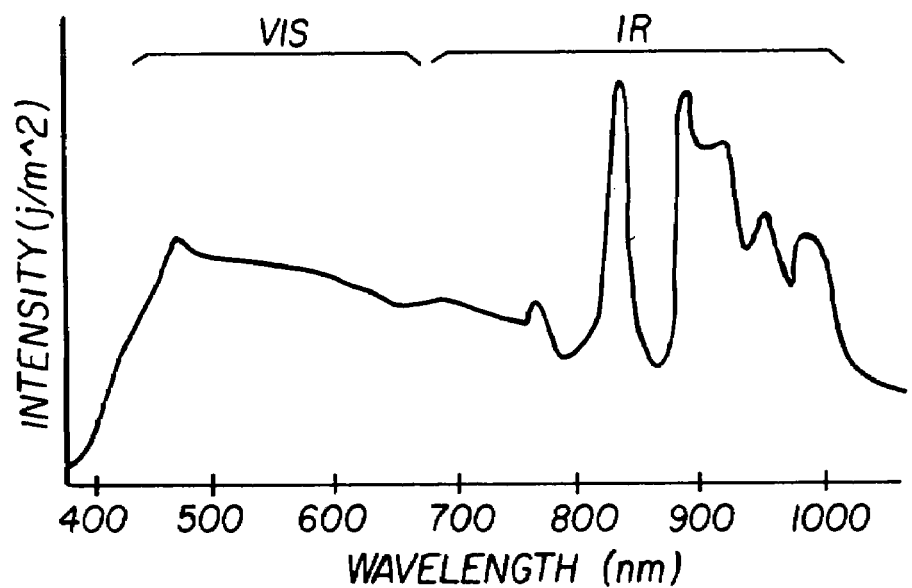
FIG. 8 is a plot of the spectral output of a prior art commercial flash unit.
Figure 9:
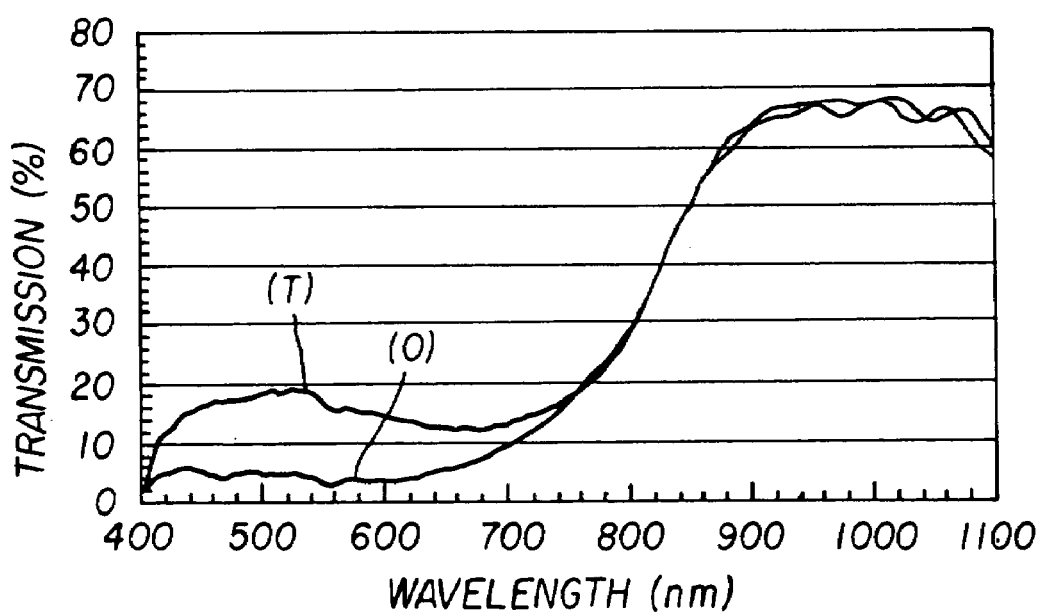
FIG. 9 is a plot of the transmission for visible and infrared wavelengths of a super twisted nematic (STN) display used in the writing apparatus shown in FIG. 7.

FIG. 8 is a plot of the spectral output of the Vivitar flash unit. Xenon flash lamps in such flash units emit both visible (VIS) and infrared (IR) radiation. A significant portion of the light output is in the infrared (IR). FIG. 9 is a plot of the transmission of the Tianma STN display for visible (VIS) and infrared (IR) wavelengths. The display has two polarization films, a first film to polarize light and a second film to selectively block light based on the polarization of light after it had passed through an electrically modulated liquid crystal layer. Plots are shown for the display in the transmissive state (T) and an opaque state (O). Transmission through the display was measured from 400 nanometers to 1100 nanometers for each of the two states. The display is designed for presentation of information in the visible spectrum, as a consequence, the design of the device passes 65% of most infrared radiation. The display blocks the majority of visible light, switching between about 18% transmission in the Transmissive mode (T) and about 4 percent in the opaque (O) visible light blocking mode, providing a 4:1 ratio in modulated visible light. The difference in transmitted and blocked energy between transmissive (T) state and opaque (O) state respectively is small when modulating light generated by a high intensity xenon flash lamp. The modulation capability is representative of transmissive liquid crystal displays with conventional liquid crystal materials and conventional polarizers. It is useful to find a method to operate the flash and apply an electrical field to create high contrast images in cholesteric material using conventional transmissive liquid crystal displays to modulate flash output.

Figure 10:
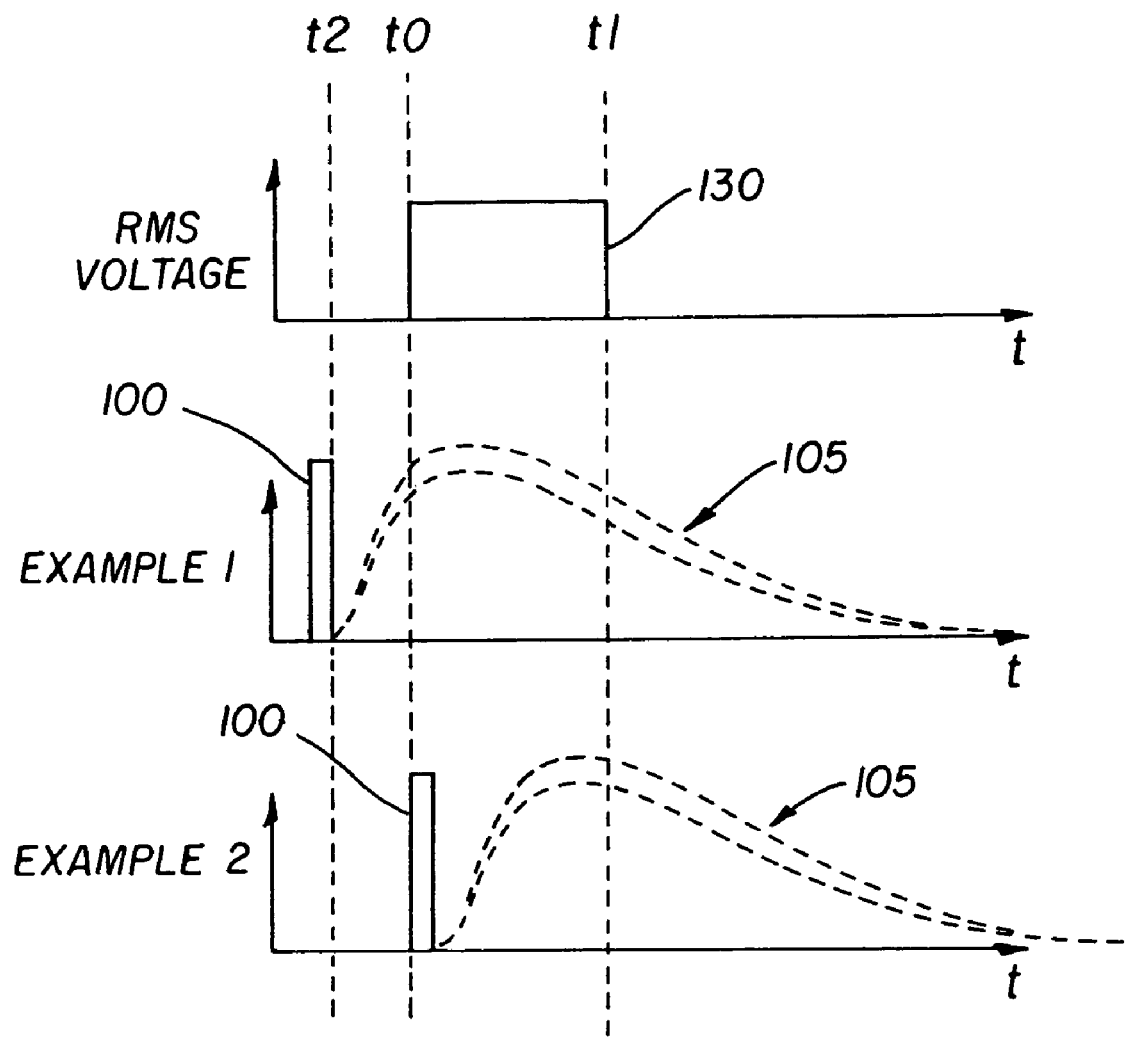
FIG. 10 is a diagram of signals applied to change the state of display in accordance with FIGS. 4 and 5.

FIG. 10 is a diagram of signals applied to change the state of display 10 in accordance with FIGS. 4 and 5. In the two examples, a flash pulse 100 is applied to display 10 either slightly before (Example 1) or at the start of development pulse 130 (Example 2). Development pulse 130 is an electrical field applied across cholesteric material in display 10. Development pulse 130 in this case is a bipolar pulse having a voltage corresponding to drive modes found in FIG. 4 and FIG. 5. In Example 1, flash pulse 100 occurs before the application of development pulse 130. Flash pulse 100 is short because xenon flash lamps emit light in under one millisecond. A thermal pulse 105 occurs as a result of the application of light from the xenon flash lamp. In example 2, flash pulse 100 occurs at the start of development pulse 130. The flash pulse 100 may also occur near the end of the development pulse 130, however the optimal amplitude of the development pulse will be different than the optimal amplitude when the flash pulse occurs at the start of the development pulse. Images can be formed using only energy from the flash unit, however image quality is significantly improved by the application of an electrical field at elevated temperatures experienced during thermal pulse 105.

Experiments were performed to investigate optimum parameters for development pulse 130. A transparency mask 54 was used to determine optimum parameters. Mask 54 had transmissive areas with over 90% transmission across all wavelengths and blocking areas with less than 10% transmission across all wavelengths. Experiments indicated that the acceptable levels of contrast in display 10 using such masks can be achieved when development pulse 130 was between 5 and 100 milliseconds. It was also determined that flash pulse 100 could occur within 5 to 10 milliseconds from the start of development pulse 130 (t2-t0). The time required for energy deposited at dark layer 35 to raise the temperature in cholesteric material 30 will be referred to herein as the delay time. When mask 54 was replaced with the STN display, the STN display created poor images on display 10 due to poor energy modulation. It became apparent therefore that an improved writing scheme using a combination of flash energy and electrical fields was needed, and was particularly needed for use with masks having low modulation capability such as STN displays.

Figure 11A:
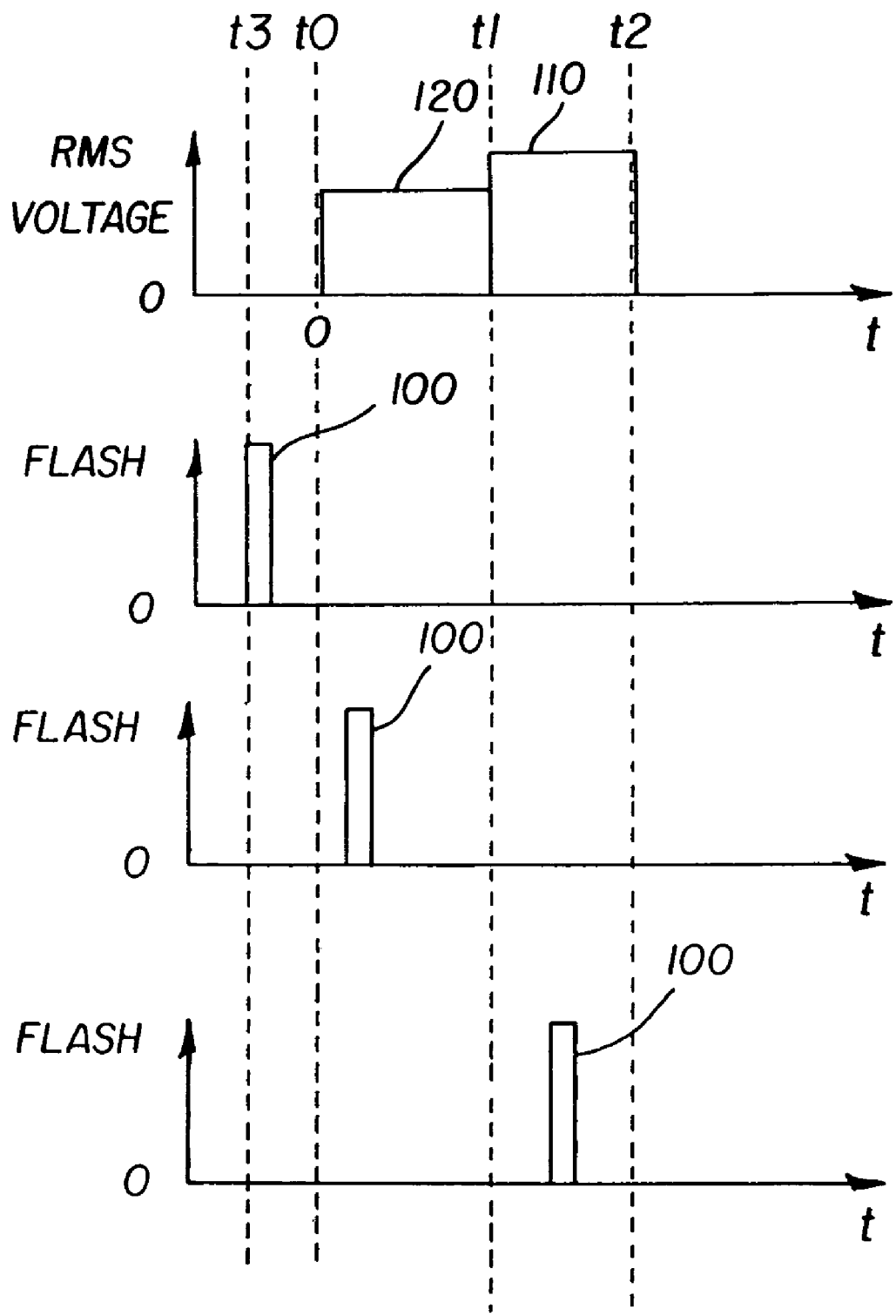
FIG. 11A is a waveform diagram useful in describing one embodiment of the writing method of the present invention using a two phase drive scheme.

FIG. 11A is a waveform diagram useful in describing one embodiment of the improved writing method of the present invention using a two phase drive scheme. A first non zero voltage pulse 120 is applied to the display. Immediately thereafter, a second non zero voltage pulse 110 having a different voltage from the first voltage pulse 120 is applied to the display. A flash light pulse 100 can be applied prior to or during the first voltage pulse 120, or during the second voltage pulse 110. By using two non zero voltage pulses, the state of the liquid crystal can be more accurately controlled before, during and/or after the flash pulse.

Experiments showed that good results were achieved when the second voltage pulse (e.g. 120V) was greater than the first (e.g. 10V for 40 milliseconds) and the duration of the second voltage pulse was less than two milliseconds and could be as short as 0.1 milliseconds. The areas receiving greater light were switched to a planar state (reflective state), while the areas receiving smaller light were converted to a focal conic state (transparent state). This image has been referred to as a positive image.

Good results were also achieved when the first voltage pulse (120V for 100 ms) was greater than the second voltage (10V for 20 ms). The areas receiving more light changed to a focal conic state (transparent state), while the areas receiving less light changed to a planar state (reflective state). The flash occurs during the second voltage. This image has been referred as a negative image.

Figure 11B:
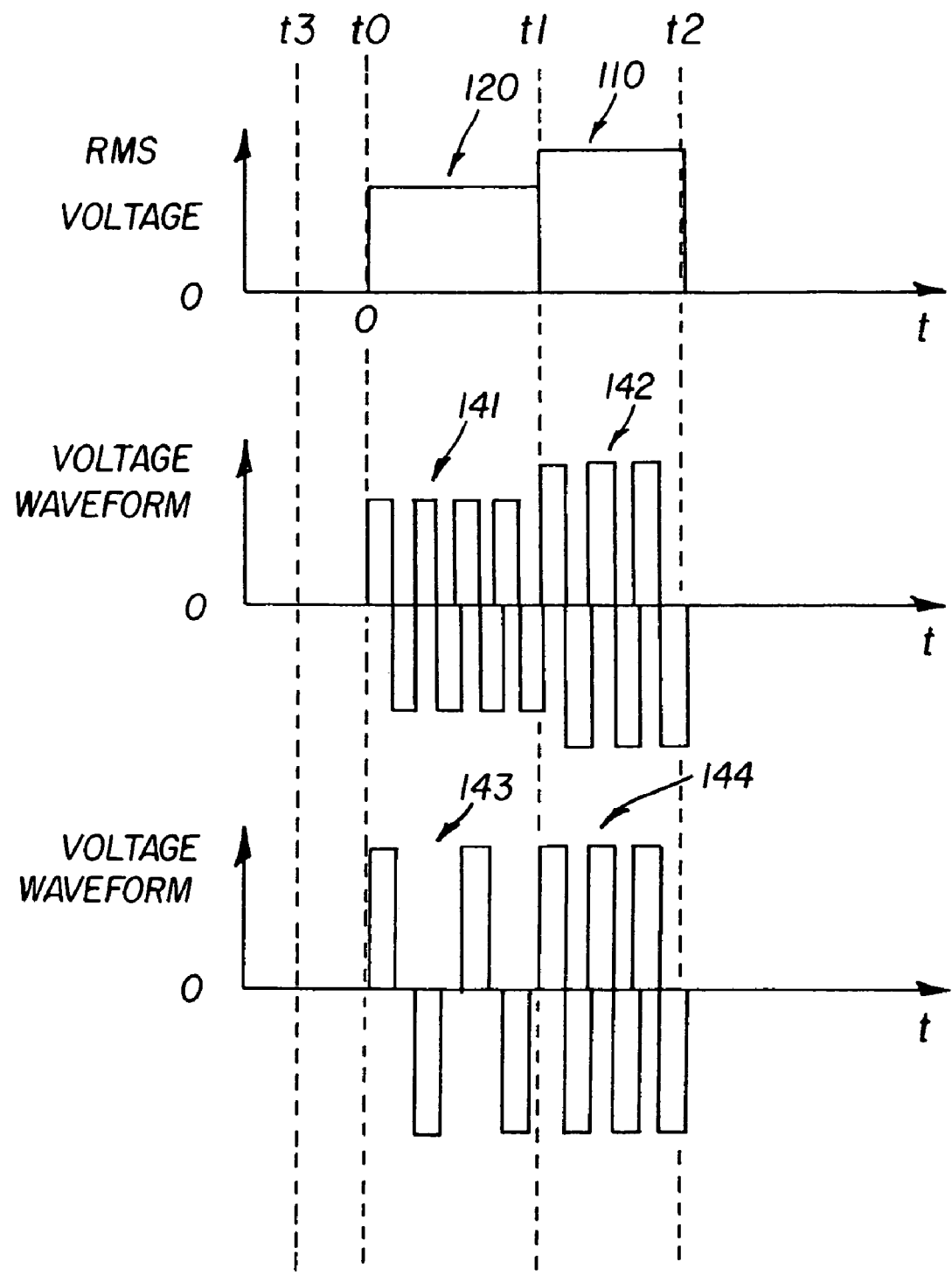
FIG. 11B is a waveform diagram useful in describing one embodiment of the writing method of the present invention using a bipolar waveform having variable amplitude and duty cycle.

FIG. 11B shows that the first and second voltages can be generated by bipolar waveforms that have the same amplitudes and different duty cycles 141, 142, or that have different amplitudes and 100% duty cycles 143, 144.

Figure 12A:
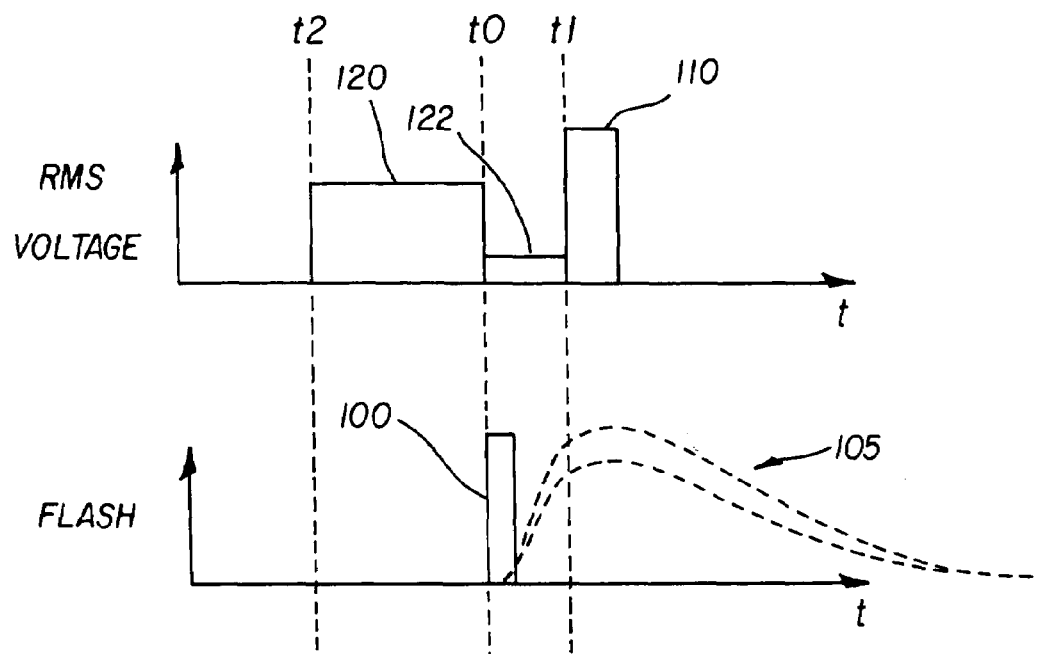
FIG. 12A is a waveform useful in describing an alternative embodiment of the writing method of the present invention using a three phase drive scheme.

FIG. 12A is a waveform diagram useful in describing an alternative embodiment of the improved writing method of the present invention using a three phase drive scheme. A third voltage pulse 122 is added between the first 120 and second 110 voltages. In one example, the first voltage pulse 120 drives cholesteric material in display 10 into the focal-conic state.

In the three phase drive scheme, a first voltage pulse 120 is applied at t2, prior to application of flash pulse 100. Flash pulse 100 is applied at time t0. A third voltage pulse 122 that functions as a holding field, is applied during the time period between the end of first preparation pulse 120 and the second voltage (referred as excitation pulse) 110 to hold the cholesteric material in a state under an electric field. Excitation pulse 110 is applied after third voltage pulse 122. The application of a series of voltages before and during the flash pulse creates good images using STN or similar masks having poor flash modulation quality. Experiments were performed to find an optimized voltage sequence. Best operation using this drive scheme with displays of the preferred embodiment had the parameters shown in Table 1 below.

TABLE 1

|  | First Voltage | Third Voltage | Second (Excitation) Voltage |
| --- | --- | --- | --- |
| Voltage | 60 V | 20 V | 120 V |
| Period | 1 ms | 1 ms | 0.1-0.5 ms |
| Cycles | 400 | 4 | 1 |

Figure 12B:
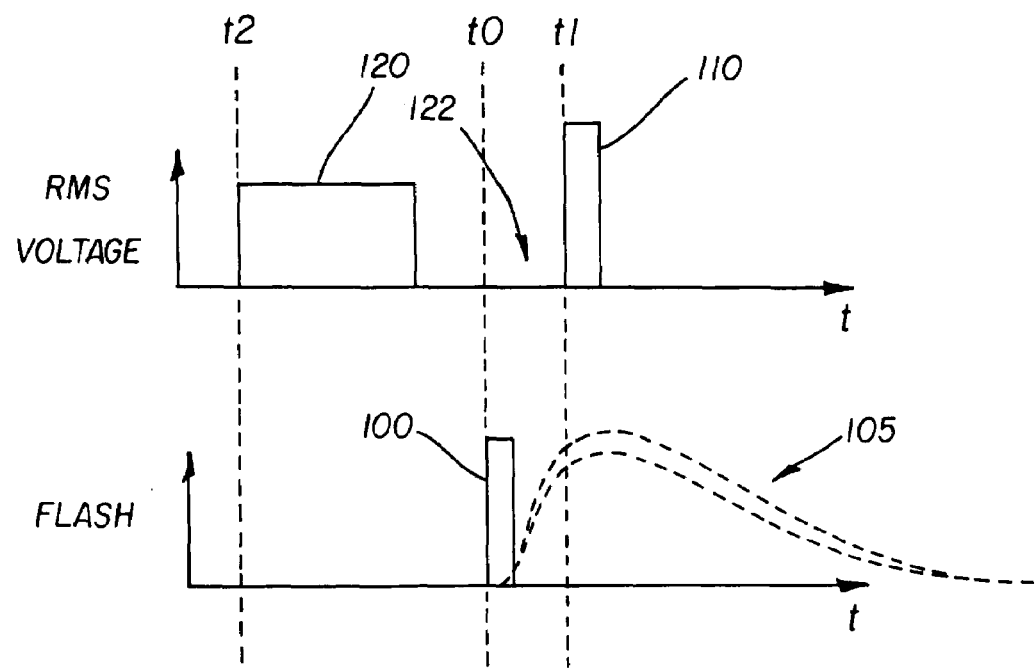
FIG. 12B is a waveform useful in describing an alternative embodiment of the writing method of the present invention using a three phase drive scheme wherein the third voltage is zero.

Referring to FIG. 12B, the third voltage 122 can be zero voltage and have a duration sufficiently long, so that the flash 100 occurs well (e.g. more than 1 second) after the end of the first voltage 120. The first voltage 120 sets the liquid crystal into a proper initial state, in one example, being the focal conic state. At an initial time (t0), flash pulse 100 is applied across a masking STN displays. Application of flash energy creates thermal pulse 105. A short time delay (t0 to t1) is provided before applying a short, high intensity excitation pulse 110 to display 10. Time delay t1-t0 permits energy deposited at dark layer 35 to raise the temperature of cholesteric layer 30. High quality images can be written using low energy modulating displays such as the Tianma unit as a masking display 94. Without wanting to be bound by the physical mechanism behind the writing, it is believed that excitation voltage 110 is applied only during the highest temperature thermal pulse 105. Eliminating electrical excitation during the cool down times of thermal pulse 105 improves responsiveness of display 10 to variation in applied energy. Excitation pulse 110 is timed to apply an electrical field at peak temperature, and omits electrical fields as cholesteric material 30 cools down.

Experiments were performed to optimize parameters under these conditions. The aforementioned STN display was used as the optical mask. It was found for experimental displays 10 formed in accordance with one embodiment, a time delay of approximately 4 milliseconds was optimum before the application of excitation pulse 110. Excitation pulse 110 was preferably applied for a time period of 0.20 to 0.70 millisecond at voltages between 90 and 120 volts. Experiments used to generate data in FIG. 4 and FIG. 5. used a high contrast mask 54 and applied development pulse 130 for a time period corresponding to the entire duration of thermal pulse 105. The short, high voltage pulses of excitation pulse 110 applied during the peak temperature of thermal pulse 105 created high contrast, high brightness images using STN displays poorer energy modulation than mask 54. The image quality of STN masked images was improved over drive schemes using low voltage, long time period electrical drive schemes referenced in FIG. 4 and FIG. 5.

Figure 13:
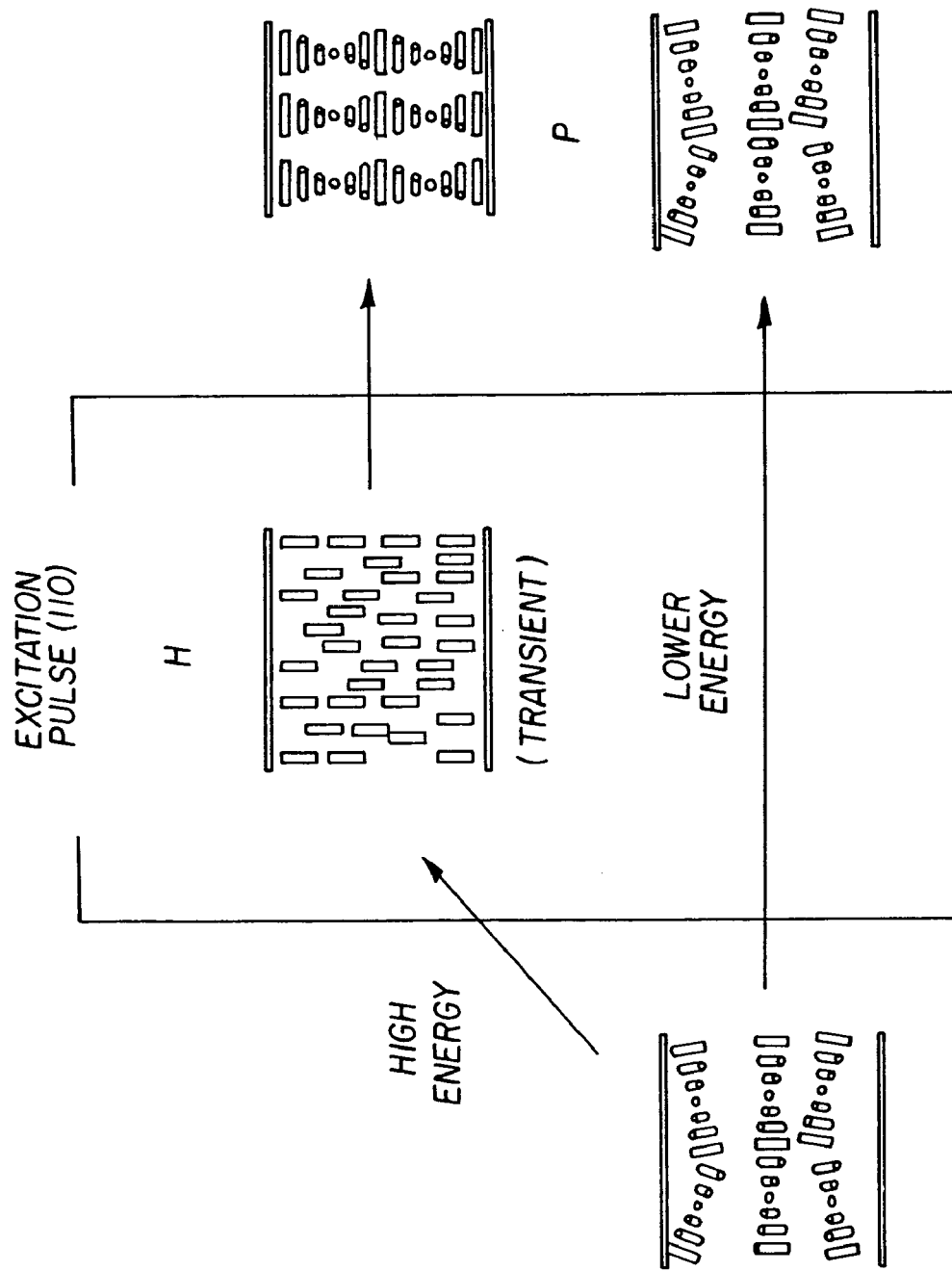
FIG. 13 is a representation of states of liquid crystals written in accordance with the method shown in FIG. 12B.

FIG. 13 is a representation of states of liquid crystals written in accordance with the present invention. In the invention, liquid crystal material is first written into the focal conic state (FC). A short, high voltage excitation pulse 100 replaces development pulse 130. During the tie corresponding to maximum temperature, excitation pulse 110 converts focal conic liquid crystal into a transient homeotropic (H) state. After thermal pulse 105, material in the homeotropic state changes into reflective planar liquid crystal. At slightly lower temperatures, corresponding to lower applied energy through masking display 94, focal conic material remains in the focal conic state. This drive method provides good image quality with slight differences in energy levels, as provided by simple STN displays. It can also be applicable in other systems providing greater differences in energy. Applying a sequence of drive voltages initializes cholesteric material and electrically maintains cholesteric material in the initialized state during the writing process.

Figure 14:
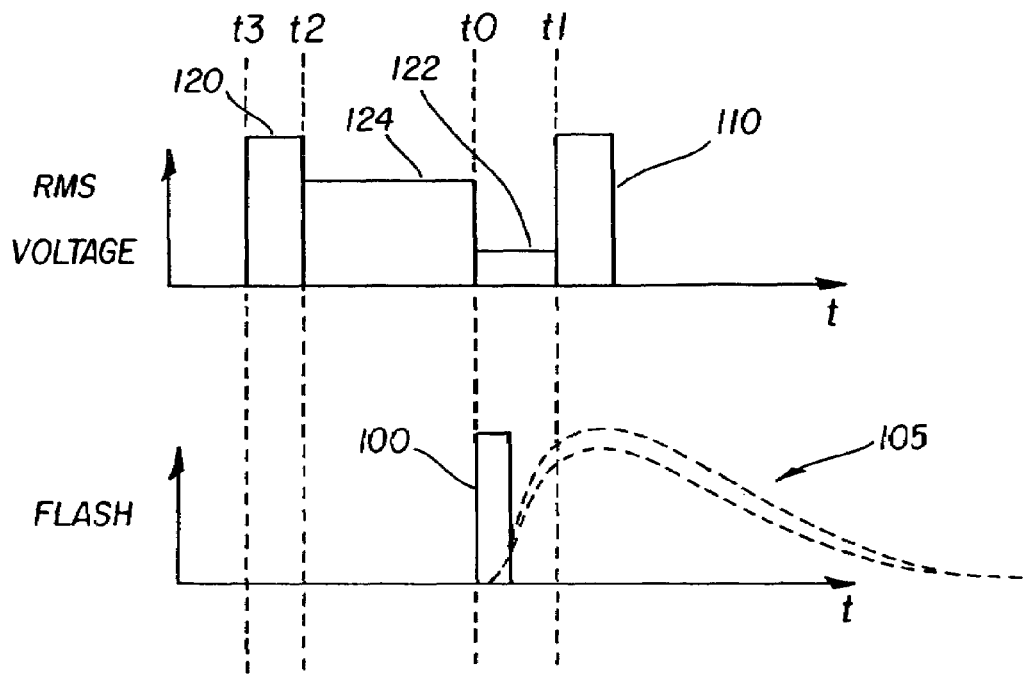
FIG. 14 is a waveform useful in describing an alternative embodiment of the writing method of the present invention using a four phase drive scheme.

FIG. 14 is a waveform diagram useful in describing an alternative embodiment of the improved writing method of the present invention using a four phase drive scheme. A fourth voltage pulse 124 is added between the first 120 and third 122 voltages. The combination of the first 120 and fourth 124 voltages allows more control of liquid crystal states before the flash 110 occurs. In one example, the first voltage 120 is a high voltage that aligns cholesteric material into the homeotropic state. A lower voltage 124 is then applied to convert the material into the focal conic state. It is believed that the sequence of voltages, which switch the cholesteric material first into the homeotropic and then the focal conic state, drives cholesteric material into a state that is more suitable for subsequent voltages 122 and 110 and flash to convert the cholesteric liquid crystal material into two optically distinct states depending on the amount of light that the material receives. Display 10 written using this procedure had good contrast. The application of a series of voltages before and during the flash pulse drives cholesteric material into preferred states and maintains those states. Such drive schemes create good images using STN or similar masks having poor flash-modulation quality. Best operation using this drive scheme with displays of the preferred embodiment had the parameters shown in Table 2.

TABLE 2

|  | First Voltage | Fourth Voltage | Third Voltage | Second (Excitation) Voltage |
| --- | --- | --- | --- | --- |
| Voltage | 120 V | 55 V | 20 V | 120 V |
| Period | 1 ms | 1 ms | 12 ms | 0.2 ms |
| Cycles | 100 | 45 | 1 | 1 |

A series of fields having varying voltage and time can be applied to prepare the cholesteric material prior to and during flash pulse 100 and excitation pulse 110. In general, these pulse trains convert the cholesteric material into the focal conic state and are followed by a short, high voltage pulse to convert cholesteric material from the focal conic to the transient homeotropic to form a planar texture. A series of pulses having various voltage and duration can be applied prior to the flash and between the flash and excitation pulse to improves display quality. These schemes are all useful in writing displays 10 with STN displays having poor light modulation.

Figure 15:
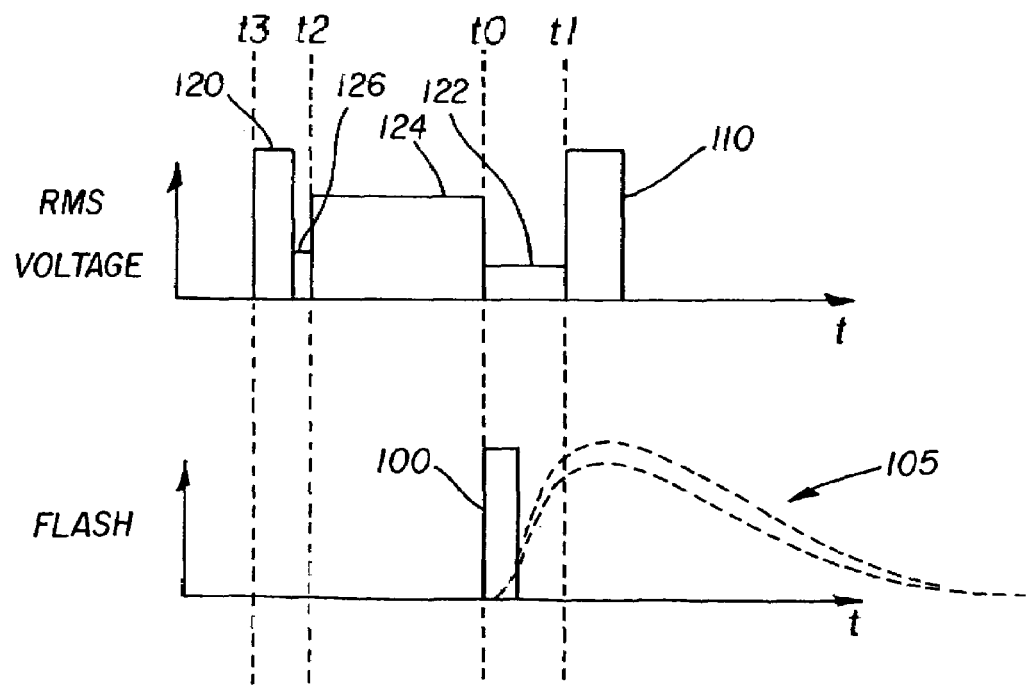
FIG. 15 is a waveform useful in describing an alternative embodiment of the writing method of the present invention using a five phase drive scheme.

FIG. 15 is a waveform diagram useful in describing an embodiment of the improved writing method of the present invention using a five phase drive scheme. A fifth voltage pulse 126 is added between the first 120 and fourth 124 voltages. The combination of the first 120, fifth 126, and fourth 124 voltages allows further control of liquid crystal states before the flash 100 occurs. In one example, the first voltage 120 is a high voltage that aligns cholesteric material into the homeotropic state. A lower and short voltage 126 is then applied to convert the material into a transient planar state. A medium voltage 124 is then applied to convert the material into the focal conic state. At the end of the fourth voltage 124, it is believed that the cholesteric material is in a dynamic evolutional process, that will evolve to a stable focal conic state if a sufficiently long time is provided. This dynamic process is more suitable for subsequent voltages 122 and 110 and flash to convert the cholesteric liquid crystal material into two optically distinct states depending on the amount of light that the material receives. Display 10 written using this procedure had good contrast. The application of a series of voltages before and during the flash pulse drives cholesteric material into preferred states and maintains those states. Such drive schemes create good images using STN or similar masks having poor flash-modulation quality.

With various combinations of the first 120, fifth 126 and fourth 124 voltages as known in the art, and the end of the fourth voltage, the cholesteric liquid crystal material can be in a stable planar or focal conic or combination of planar and focal conic state, or in a known dynamic process such as from the homeotropic to focal conic state, or from the homeotropic to planar state, or from the transient planar to focal conic state, or from planar to focal conic state.

The flash 100 can also occur during the fourth and fifth voltages. More voltage phases allow further improvement at a higher cost. In three phase, four phase, and five phase drive waveforms, the first, second, third, fourth, and fifth voltages can be generated by bipolar waveforms that have the same amplitudes and different duty cycles, or that have the different amplitudes and 100% duty cycle.

Figure 16:
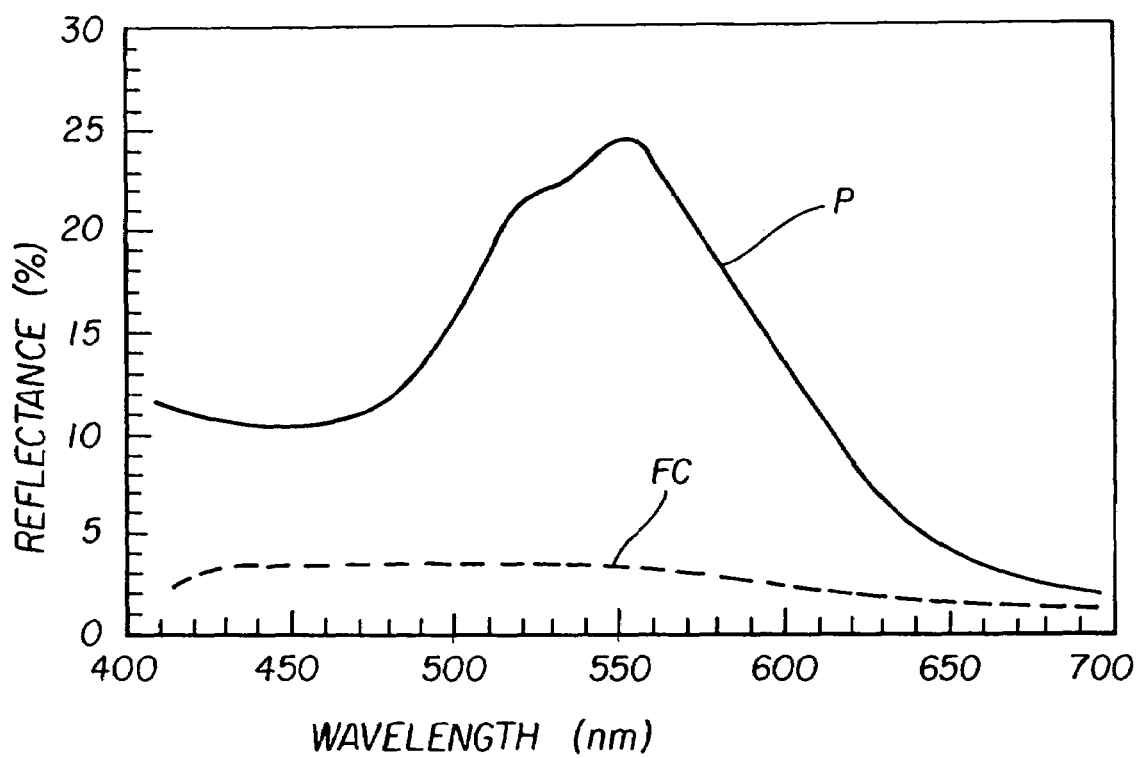
FIG. 16 is a spectra plot of the reflectance of a display written in accordance with the present invention.

FIG. 16 is a spectra plot of the reflectance of a display written in accordance with the present invention. A display made in accordance with the current embodiment was written using a high intensity xenon flash, the aforementioned STN display and a multi-phase drive scheme. The written image had a peak reflection of 24% in the planar state (P) and 3.5% reflection in the focal-conic (FC) state, with a contrast ratio of 6.8. Displays 10 written with such optical characteristics have useful application in commercial systems.

The invention has been described in detail with particular reference to certain preferred embodiments thereof, but it will be understood that variations and modifications can be effected within the spirit and scope of the invention.

| PARTS LIST | |
|---|---|
| 10 | display |
| 15 | display substrate |
| 20 | first transparent conductor |
| 20' | exposed first conductor |
| 22 | first conductor cover |
| 30 | cholesteric layer |
| 35 | dark layer |
| 40 | second conductor |
| 50 | electrodes |
| 52 | flash |
| 54 | mask |
| 60 | incident light |
| 62 | reflected light |
| 72 | planar liquid crystal |
| 74 | focal conic liquid crystal |
| 80 | object |
| 82 | contacts |
| 90 | writer |
| 91 | power supply |
| 92 | flash capacitor |
| 93 | display drive |
| 94 | masking display |
| 95 | controller |
| 96 | trigger circuit |
| 100 | flash pulse |
| 105 | thermal pulse |
| 110 | second (excitation) voltage pulse |
| 120 | first voltage pulse |
| 122 | third voltage pulse |
| 124 | fourth voltage pulse |

| -continued | |
|---|---|
| PARTS LIST | |
| 126 | fifth voltage pulse |
| 130 | development pulse |
| 141-144 | bipolar waveforms |

What is claimed is:

1. A method of writing an image on a liquid crystal display of the type having a layer of cholesteric liquid crystal material disposed between a pair of unpatterned conductors and a light absorbing layer for forming an image wise thermal pattern in response to an image wise pattern of light, comprising:
    applying a first RMS voltage to the conductors;
    applying a second RMS voltage different from the first RMS voltage to the conductors after applying the first RMS voltage, wherein the first and second RMS voltages are non-zero;
    applying a third voltage between the first and second RMS voltages; and
        exposing the liquid crystal display to the image wise pattern of light during the application of the third voltage, wherein the third voltage is less than the first and second RMS voltages, and wherein the exposing occurs more than 1 second after applying the first RMS voltage.

2. The method claimed in claim 1, wherein the step of exposing occurs prior to the application of the first non-zero voltage.

3. The method claimed in claim 1, wherein the step of exposing occurs during the application of the first non-zero voltage.

4. The method claimed in claim 1, wherein the step of exposing occurs during the application of the second non-zero voltage.

5. The method claimed in claim 1, wherein the second voltage is higher than the first voltage.

6. The method claimed in claim 1, wherein the first voltage is effective to drive the cholesteric liquid crystal material to a focal conic state.

7. The method claimed in claim 1, wherein the second voltage is greater than the first and third voltages.

8. The method claimed in claim 1, wherein the third voltage is zero.

9. The method claimed in claim 1, further comprising the step of applying a fourth voltage between the first and the third voltages.

10. The method claimed in claim 1, wherein the step of exposing occurs during the application of the third voltage, and wherein the second voltage is greater than the third and fourth voltages.

11. The method claimed in claim 9, further comprising the step of applying a fifth voltage between the first and fourth voltages.

12. The method claimed in claim 11, wherein the step of exposing occurs during the application of the third voltage, and wherein the second voltage is greater than the third, fourth and fifth voltage.

13. The method claimed in claim 5, wherein the duration of the second voltage is less than 2 milliseconds.

14. The method claimed in claim 1, wherein the step of exposing the display to an image wise pattern of light is performed with a mask and a flash lamp.

15. The method claimed in claim 14, wherein the mask is electronically programmable to define the image wise pattern of light.

16. The method claimed in claim 15, wherein the mask is a liquid crystal device.

17. The method claimed in claim 1, wherein the cholesteric liquid crystal layer is a polymer dispersed layer.

18. The method claimed in claim 17, wherein the polymer is gelatin.

19. The method claimed in claim 1, wherein the first and second voltages are generated by bipolar waveforms that have the same amplitudes and different duty cycles.

20. The method claimed in claim 1, wherein the first, second and third voltages are generated by bipolar waveforms that have the same amplitudes and different duty cycles.

21. The method claimed in claim 9, wherein the first, second, third and fourth voltages are generated by bipolar waveforms that have the same amplitudes and different duty cycles.

22. The method claimed in claim 11, wherein the first, second, third, fourth and fifth voltages are generated by bipolar waveforms that have the same amplitudes and different duty cycles.

23. Apparatus for writing an image on a liquid crystal display of the type having a layer of cholesteric liquid crystal material disposed between a pair of unpatterned conductors and a light absorbing layer for forming an image wise thermal pattern in response to an image wise pattern of light, comprising:
    means for applying a first RMS voltage to the conductors;
    means for applying a second RMS voltage different from the first RMS voltage to the conductors after applying the first RMS voltage, wherein the first and second RMS voltages are non-zero;
    means for applying a third voltage between the first and second RMS voltages; and
        (a) means for exposing the liquid crystal display to the image wise pattern of light during the application of the third voltage, wherein the third voltage is less than the first and second RMS voltages, and wherein the exposing occurs more than 1 second after applying the first RMS voltage.

24. The apparatus claimed in claim 23, wherein the means for exposing the liquid crystal display exposes the liquid crystal display to the image wise pattern of light prior to the application of the first non-zero voltage.

25. The apparatus claimed in claim 23, wherein the second voltage is higher than the first voltage.

26. The apparatus claimed in claim 23, wherein the first voltage is effective to drive the cholesteric liquid crystal material to a focal conic state.

27. The apparatus claimed in claim 23, wherein the means for exposing the display to an image wise pattern of light includes a mask and a flash lamp.

28. The apparatus claimed in claim 27, wherein the mask is electronically programmable to define the image wise pattern of light.

29. The apparatus claimed in claim 28, wherein the mask is a liquid crystal device.

30. The apparatus claimed in claim 23, wherein the cholesteric liquid crystal layer is a polymer dispersed layer.

31. The apparatus claimed in claim 30, wherein the polymer is gelatin.

32. The apparatus claimed in claim 23, wherein the first and second voltages are generated by bipolar waveforms that have the same amplitudes and different duty cycles.

33. A method of writing an image on a liquid crystal display of the type having a layer of cholesteric liquid crystal material disposed between a pair of unpatterned conductors and a light absorbing layer for forming an image wise thermal pattern in response to an image wise pattern of light, comprising:
    (a) applying a first voltage to the conductors;
    (b) applying a second voltage different from the first voltage to the conductors after applying the first voltage, wherein the first and second voltages are non-zero;
    (c) applying a third voltage between the first and second voltages wherein the third voltage is less than the first and second voltages; and
    (d) exposing the liquid crystal display to the image wise pattern of light, wherein the step of exposing occurs during the application of the third voltage, and wherein the step of exposing occurs more than 1 second after the first voltage.

* * * * *